Aug. 12, 1924.  
W. O. MILLER  
1,504,259  
WIND POWER GENERATOR  
Filed June 22, 1923

Inventor  
William O. Miller,

By

Patented Aug. 12, 1924.

1,504,259

UNITED STATES PATENT OFFICE.

WILLIAM O. MILLER, OF DETROIT, MICHIGAN.

WIND-POWER GENERATOR.

Application filed June 22, 1923. Serial No. 647,024.

*To all whom it may concern:*

Be it known that I, WILLIAM O. MILLER, a citizen of the United States of America, residing at Detroit, in the county of Wayne and State of Michigan, have invented certain new and useful Improvements in Wind-Power Generators, of which the following is a specification, reference being had therein to the accompanying drawings.

This invention relates to wind engines or devices for translating the power of the atmosphere in motion into useful energy for driving electric power generators, air compressors or other devices and machines, and its object is to provide very simple and efficient means for the purpose which will generate a maximum of power and which is so constructed and arranged that it will freely turn upon a vertical axis and head into the wind without the necessity for fins, tail members or other external directional means.

A further object is to provide a member rotated by the power of the wind which will be very efficient in operation and which embodies structural bracing to provide a very strong and rigid device which may be built of any desired dimensions and will utilize the power of cross or diagonal air currents as well as the direct pressure of the wind.

It is also an object to provide a suitable support for the power member which is rotated by the wind, and which support will offer the minimum of interference and will provide a housing for devices or machinery to be driven by the wind driven power device.

It is also an object of the invention to so arrange the support as to provide free rotation of the wind driven member about a vertical axis and permit motion to be transmitted from such members without interference with such turning movement, and to provide certain other new and useful features in the construction, arrangement and combination of parts, all as hereinafter more fully described.

With the above and other ends in view, the invention consists in providing a wind screw having a blade or flange of conical spiral formation secured upon a horizontally arranged shaft which is mounted upon and supported by a casing or turret arranged to turn upon a vertical axis, and further consists in the construction, arrangement and other matters hereinafter more fully described, and particularly pointed out in the appended claims, reference being had to the accompanying drawing in which—

Fig. 4 is a longitudinal sectional detail of the wind screw, substantially upon the line IV—IV of Fig. 3.

Figure 2:
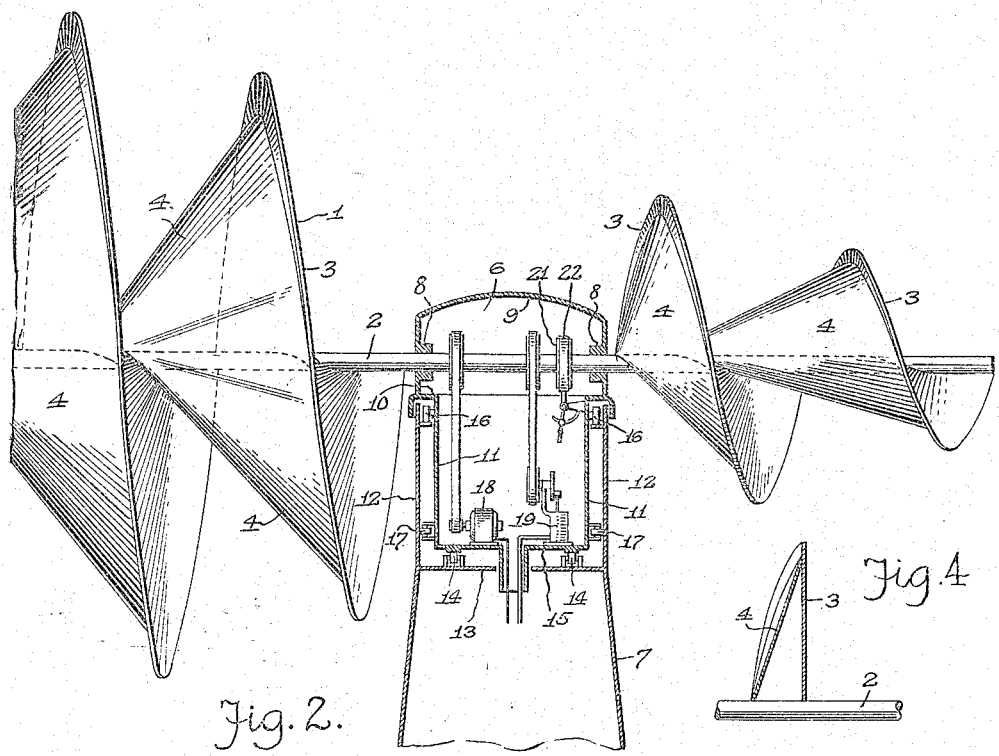
Fig. 2 is a similar view, partly in section, and drawn to a larger scale.

As shown in the drawing, 1 indicates a wind screw comprising a horizontally disposed shaft 2 upon which a blade 3 is secured, said blade extending outwardly at right angles to the shaft to provide a helical wind screw or wheel of conical form. To secure this blade to the shaft and brace the same, bracing means is provided at the rear side of the blade or the side thereof facing toward the larger end of the screw and such bracing may consist, as shown in Fig. 2, of a continuous wall 4 secured in any suitable manner at one edge to the shaft, and at its opposite edge to the blade adjacent the outer edge of the blade, said wall being inclined longitudinally of the shaft toward the rear face of the blade to which its outer edge is secured, to form a brace extending from the shaft to the blade for bracing the blade against wind pressure upon the forward face of the blade.

Figure 1:
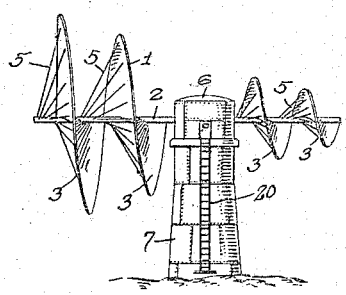
Figure 1 is a side elevation of a device illustrative of the invention.
Figure 3:
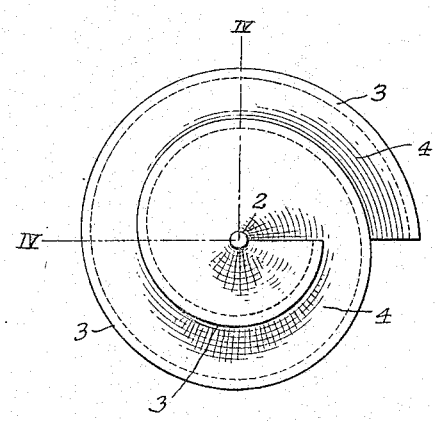
Fig. 3 is an end elevation of a wind screw.

In Fig. 1 is illustrated bracing comprising a series of rods 5 secured at one end to the shaft adjacent the base or line of attachment of the blade to the shaft and extending diagonally outward and secured at their outer ends to the next adjacent turn of the blade near the periphery of the blade. With this form of bracing as well as the continuous bracing wall 4, the bracing is at the rear side of the blade in the direction of the movement of the air currents which operate upon the forward side of the spiral blade to turn the wind screw, and therefore such bracing does not interfere with these air currents.

To support the shaft 2 of the wind screw, a suitable casing or turret 6 is mounted upon a tower 7 in a manner to permit free turning movement of the turret upon the tower, as hereinafter more fully described, and this turret is provided with bearings 8 at opposite sides thereof through which bearings the shaft extends and through the turret, the shaft being continuous and turning freely upon its own axis within said bearings, but the spiral blade 3 thereon being interrupted or made in two parts with one part on each end portion of the shaft which projects laterally from the turret. In plan view, this turret is circular and comprises an upper end wall or cap 9 and a circular side wall which is provided with the bearings 8 for the shaft 2 and is also preferably formed intermediate its ends with an inwardly extending annular shoulder forming an offset in the wall, and a lower reduced end portion 11 adapted to extend within the tubular upper end portion 12 of the tower, which tower portion has a bottom wall 13 or the like adapted to form a support for the turret, anti-friction members, such as rollers 14 being interposed between said support and the lower end or floor 15 of the turret. Similar anti-friction members 16 are also carried by the turret adjacent the shoulder 10 to run upon a suitable track on the wall of the tubular end portion 12 of the tower, and side thrust rollers 17 or the like are interposed between said wall and the wall of the reduced end portion 11 of the turret. The turret is thus mounted partially within the upper tubular end of the tower to turn freely upon a vertical axis, so that the wind screw may swing upon this vertical axis to head into the wind, that is, with its end of smallest diameter directed toward the wind, and such swinging movement is effected by the pressure of the wind upon the screw, as such screw is of considerably larger diameter at one end than at the other. The wind screw will therefore always point toward the wind and be in operative position.

As the shaft of the wind screw is carried by the turret and extends through the upper part thereof, the turret will be turned by the swinging of the screw, and as this turret is of comparatively large dimensions, it may be utilized as a power generator or machinery room in which may be mounted an electric generator indicated at 18, an air compressor, indicated at 19 or the like, adapted to be driven directly from the shaft 2 of the wind screw by means of pulleys and belts or any other suitable means for transmitting power through a direct connection with said shaft, this direct transmission of power being made possible by the mounting of such power generators within the turret which turns with the swinging of the wind screw upon the vertical axis of the tower or support for the shaft of the screw. The space within the tower below the turret may be utilized as storage space for air put under pressure by the air compressor or for any other purpose, and as shown in Fig. 1, access may be had to the interior of the turret by means of a ladder 20 which is secured to the upper part of the turret and leads to a door opening therein, the lower end of the ladder riding upon the exterior of the tower to turn with the turret so that the ladder will always be opposite the door, regardless of the rotation of the turret.

In order to check or stop the rotation of the wind screw, when desired, a brake drum 21 may be provided upon the shaft 2 within the turret and means provided to frictionally engage this drum, such as a brake band 22 or the like, and which band may be operated by any suitable means to bring it into frictional contact with the surface of the drum.

With this arrangement of wind screw, a large amount of power will be generated due to the tapering or conical form of the screw, as each turn of the screw blade is presented to the wind with the surface of the blade inclined rearwardly in the direction of the wind, thus causing the blade to be acted upon throughout its entire length and also inwardly of the blade toward the shaft, the air in motion following along the blade and escaping at the rear end of the screw without being thrown off laterally to the same extent as in an ordinariy wind wheel. Lateral or diagonal air currents will also act upon the spiral blade, and as the turret which supports the wind screw is circular in plan view, it will offer a minimum of resistance and deflection to air currents flowing longitudinally of the screw. As all working parts are housed within the turret, they do not interfere with the free flow of the air currents and motion to drive the same may be taken directly from the wind screw shaft, and conduits or other means for delivering the current or air pressure generated by the generator or air compressor in the turret may be led from the turret at the vertical axis thereof without the necessity for complicated joints or connections.

The bracing for the blade of the wind screw being at the rear side of the blade, supports the blade against the pressure of the wind upon its front face, and said front face presents a smooth surface. The bracing being at the rear side of the blade, will not interfere with, or deflect the air currents, and a very strong, rigid structure is secured which is light in weight as compared with its diameter. These wind screws may, therefore, be constructed as large as desired, in order to generate the desired amount of power, and it is obvious that other changes may be made in the size and proportion of the parts and in the details of construction within the scope of the appended claims, without departing from the spirit of the invention.

What I claim is:

1. A device of the character described including a member to be rotated by air currents and comprising a shaft and a blade extending longitudinally and spirally of the shaft, said spiral being of gradually increasing diameter from one end of the shaft toward the opposite end, and means for pivotally supporting said shaft intermediate its ends, whereby wind pressure will turn said member upon its pivotal support with its end of smallest diameter facing the wind.

2. A device of the character described including a wind member comprising a shaft and a blade extending longitudinally and spirally of said shaft, said spiral blade being interrupted intermediate the ends of said shaft, and a support for said shaft rotatable upon a vertical axis, said shaft being supported by said support intermediate its ends within the interruption of said blade.

3. A device of the character described including a wind screw comprising a horizontally disposed shaft and a blade extending longitudinally of the shaft from each end thereof and interrupted intermediate the ends of said shaft, said blade being of greater diameter at one end of the shaft than at the opposite end thereof, a support for said shaft within the interruption of said blade, said support being provided with bearings within which the shaft is free to rotate upon its longitudinal axis and said support being rotatable upon a vertical axis.

4. A device of the character described comprising a support rotatable upon a vertical axis, a horizontally disposed shaft mounted in bearings on said support intermediate its ends, with the end portions of said shaft extending laterally beyond said support, and a blade secured upon the projecting end portions of said shaft longitudinally and spirally thereof with the spiral interrupted at the support and of gradually decreasing diameter from one end of the shaft toward the other.

5. A wind screw comprising a horizontally disposed shaft and a blade extending longitudinally and spirally of said shaft to the extreme ends of said shaft, said blade being of gradually decreasing diameter from one end of the shaft toward the opposite end thereof.

6. A wind screw comprising a horizontally disposed shaft and a blade secured to said shaft and extending longitudinally and spirally thereof to the ends of said shaft, and bracing for said blade at the rear side thereof in the direction of wind pressure upon the blade.

7. A wind screw comprising a horizontally disposed continuous shaft, a blade on said shaft extending longitudinally and spirally thereof to its extreme ends, said blade being interrupted intermediate its ends and of greater diameter at one end of the shaft than at the opposite end thereof, said shaft being supported within said interruption of the blade to swing freely upon a vertical axis, and bracing for said blade at the rear side of the blade in the direction of wind pressure thereon.

8. A wind-power generator including a wind screw comprising a horizontally disposed shaft and a blade extending longitudinally and spirally of said shaft with said spiral of greater diameter at one end of said shaft than at the opposite end, and a turret provided with bearings for said shaft and rotatable upon a vertical axis, said turret forming a housing for means for transmitting motion from said shaft.

9. A wind-power generator comprising a tower, a turret rotatable upon said tower, a horizontally disposed shaft mounted in bearings on said turret to rotate freely upon its longitudinal axis and swing with the turret upon the vertical axis thereof, means within the turret for transmitting motion from the shaft, and a blade on the shaft extending longitudinally and spirally thereof to the extreme ends of the shaft and interrupted intermediate its ends to provide a space for the support of said shaft by the turret, said spiral blade being of gradually decreasing diameter from one end of the shaft to the opposite end thereof.

10. A wind-power generator comprising a tower, a turret of tubular form mounted upon said tower to turn freely thereon about a vertical axis, a horizontally disposed shaft extending through said turret with end portions extending laterally in opposite directions from said turret and mounted in bearings on said turret to turn freely thereon, a blade extending longitudinally and spirally of each laterally extending end portion of the shaft, means upon said shaft within said turret for transmitting motion from said shaft, and means within said turret and carried thereby to turn therewith, for utilizing motion transmitted from said shaft.

11. A wind-power generator comprising a tower having a tubular upper end portion, a closed cylindrical turret projecting into the tubular upper end portion of the tower, anti-friction means interposed between said turret and tower walls to permit free turning movement of the turret upon the tower about a vertical axis, a horizontally disposed shaft extending through and mounted in bearings on said turret with end portions of said shaft extending laterally in opposite directions beyond opposite sides of said turret, a blade extending longitudinally and spirally of each projecting end portion of the shaft with said spiral of gradually decreasing diameter from one end of said shaft to the other end thereof, a bracing wall at the rear side of said blade in the direction of wind pressure upon the blade and extending throughout the length of the blade and inclined toward the blade, and means within said turret carried thereby to turn therewith for transmitting motion from said shaft and converting said motion into useful energy.

In testimony whereof I affix my signature in presence of two witnesses.

WILLIAM O. MILLER.

Witnesses:
 LEWIS E. FLANDERS,
 ETHEL V. SEIBEL.